Patented Dec. 24, 1946

2,413,038

UNITED STATES PATENT OFFICE 2,413,038

STABILIZED ACETALDEHYDE AND METHOD

Joseph Gray Dinwiddie, Waynesboro, Va., assignor to E. I. du Pont de Nemours & Company, Wilmington, Del., a corporation of Delaware No Drawing. Application August 20, 1943, Serial No. 499,405

5 Claims. (Cl. 260—601)

This invention relates to the stabilization of acetaldehyde or acetaldehyde-containing liquors against polymerization during storage and distillation.

Acetaldehyde, when kept in storage for any length of time, tends to polymerize and form polymeric products, such as paraldehyde and metaldehyde, which generally are undesirable. Also, distillation and rectification of acetaldehyde or liquors consisting predominantly of acetaldehyde is accompanied by a rapid conversion of acetaldehyde into polymeric form.

Accordingly, it is an object of this invention to provide a polymerization inhibitor which is directly soluble in the acetaldehyde and which can be easily separated from the acetaldehyde, for instance, by redistilling the acetaldehyde at the time it is to be used. Other objects of the invention will be apparent from the description that follows.

The objects of this invention are accomplished by incorporating in acetaldehyde before, during and/or after rectification a small amount of a soluble metal resinate, such as the copper, zinc, aluminum, magnesium and cobalt resinate.

Metal resinates of commerce are essentially abietates containing various impurities and varying within relative small proportions. Since metal resinates of commercial grades are entirely satisfactory for the purpose of the present invention and considerably more economical than metal abietates, it is preferred to use them as a matter of economy and convenience.

Only a very small amount of soluble metal resinate is needed to effect substantial stability of acetaldehyde; for example, as little as 0.01% of copper resinate, based on the weight of the acetaldehyde treated will very noticeably improve the stability of the acetaldehyde. However, under certain circumstances, it may be desirable to use up to 1% of the soluble metal resinate. Generally about 0.1% of soluble metal resinate based on the weight of the acetaldehyde is preferred.

To further illustrate this invention, the following specific example is given. Parts and percentage compositions are by weight unless otherwise indicated.

Example

To 1000 parts of acetaldehyde freshly condensed from the rectification column, 1 part of copper resinate is added and the acetaldehyde so treated set aside for a storage test. After 5 weeks, a sample of the acetaldehyde was tested and was found to contain less than 2% of polymer. A similar sample of acetaldehyde used as a control was found to contain, under the same conditions of testing, about 20% of polymer.

While the specific example illustrates the stabilization of pure or substantially pure acetaldehyde, it is to be understood that the invention is not so limited but comprehends too the stabilization of acetaldehyde-containing liquors which comprise in addition, water, acetic acid and/or other miscible substance but which consist predominantly of acetaldehyde.

The chief advantages of my invention are that the stabilizing agents are inexpensive, readily obtainable, and can be easily and completely recovered from the acetaldehyde for reuse if desired, and effectively stabilize the acetaldehyde under all conditions for long periods of time.

As many widely different embodiments of this invention may be made without departing from the spirit and scope thereof, it is to be understood that the invention is not limited to the specific embodiments thereof except as defined in the appended claims.

I claim:

1. A method for inhibiting polymerization of acetaldehyde during storage and distillation which comprises incorporating in an acetaldehyde-containing solution a small amount of a metal resinate soluble in said solution.

2. A method for inhibiting polymerization of acetaldehyde during storage and distillation which comprises incorporating in an acetaldehyde-containing solution from about 0.01% to about 1.0% by weight, based on the weight of acetaldehyde, of a metal resinate soluble in said solution.

3. A method for inhibiting polymerization of acetaldehyde during storage and distillation which comprises incorporating in an acetaldehyde-containing solution about 0.1% by weight, based on the weight of acetaldehyde, of a metal resinate soluble in said solution.

4. A method for inhibiting polymerization of acetaldehyde during storage and distillation which comprises incorporating in said acetaldehyde about 0.1% by weight, based on the weight of acetaldehyde, of copper resinate.

5. A composition comprising essentially acetaldehyde and from about 0.01% to about 1.0% by weight, based on the weight of acetaldehyde, of a soluble metal resinate.

JOSEPH G. DINWIDDIE.